Nov. 24, 1959  R. L. LICH  2,913,998
RAILWAY VEHICLE TRUCK STRUCTURE
Filed Oct. 25, 1956  6 Sheets-Sheet 1

INVENTOR.
RICHARD L. LICH
BY
Francis T. Burgess
ATTORNEY

Nov. 24, 1959    R. L. LICH    2,913,998
RAILWAY VEHICLE TRUCK STRUCTURE
Filed Oct. 25, 1956    6 Sheets-Sheet 2

INVENTOR.
RICHARD L. LICH
BY
Francis T. Burgess
ATTORNEY

Nov. 24, 1959 — R. L. LICH — 2,913,998
RAILWAY VEHICLE TRUCK STRUCTURE
Filed Oct. 25, 1956 — 6 Sheets-Sheet 3

INVENTOR.
RICHARD L. LICH
BY
Francis T. Burgess
ATTORNEY

Nov. 24, 1959  R. L. LICH  2,913,998
RAILWAY VEHICLE TRUCK STRUCTURE
Filed Oct. 25, 1956  6 Sheets-Sheet 4

INVENTOR.
RICHARD L. LICH
BY
Francis T. Burgess
ATTORNEY

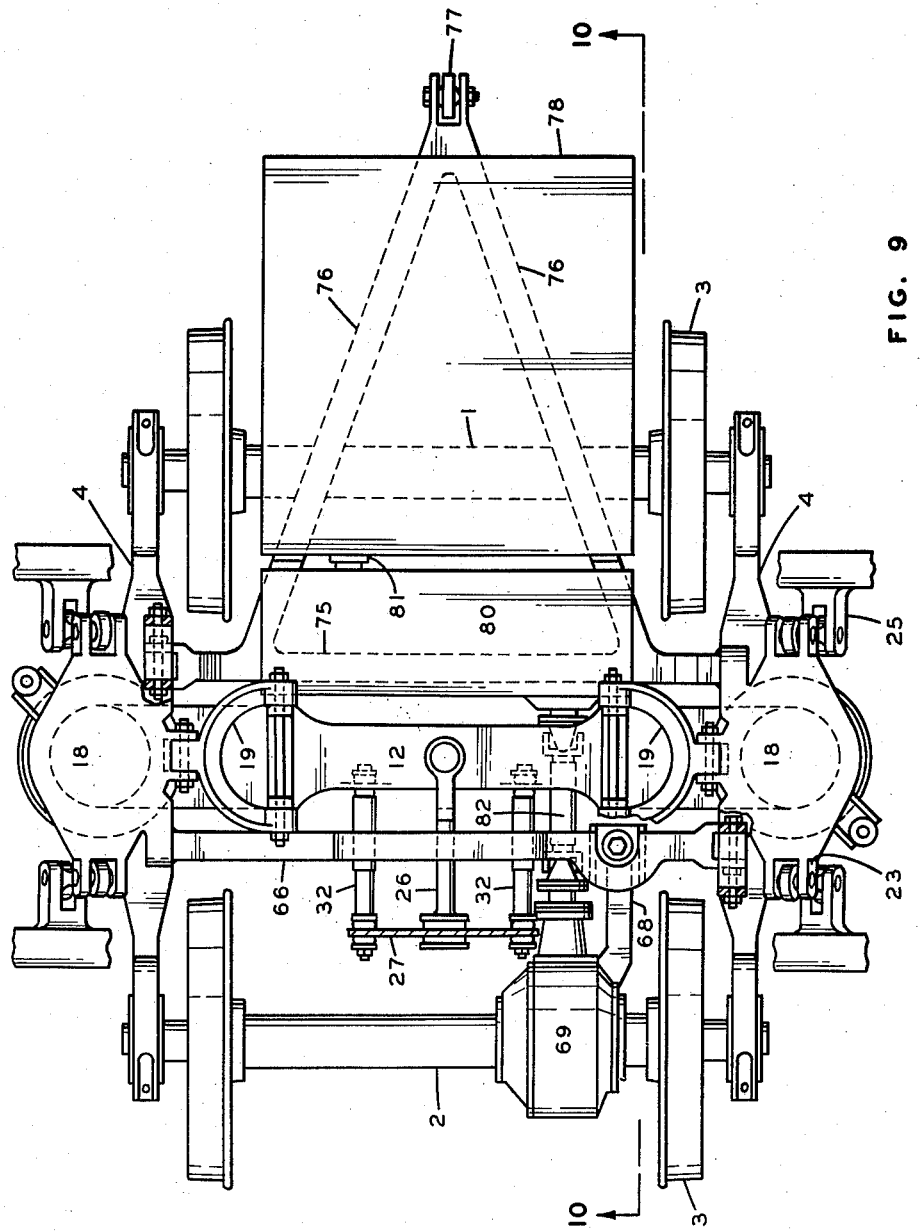

Nov. 24, 1959    R. L. LICH    2,913,998
RAILWAY VEHICLE TRUCK STRUCTURE
Filed Oct. 25, 1956    6 Sheets-Sheet 6
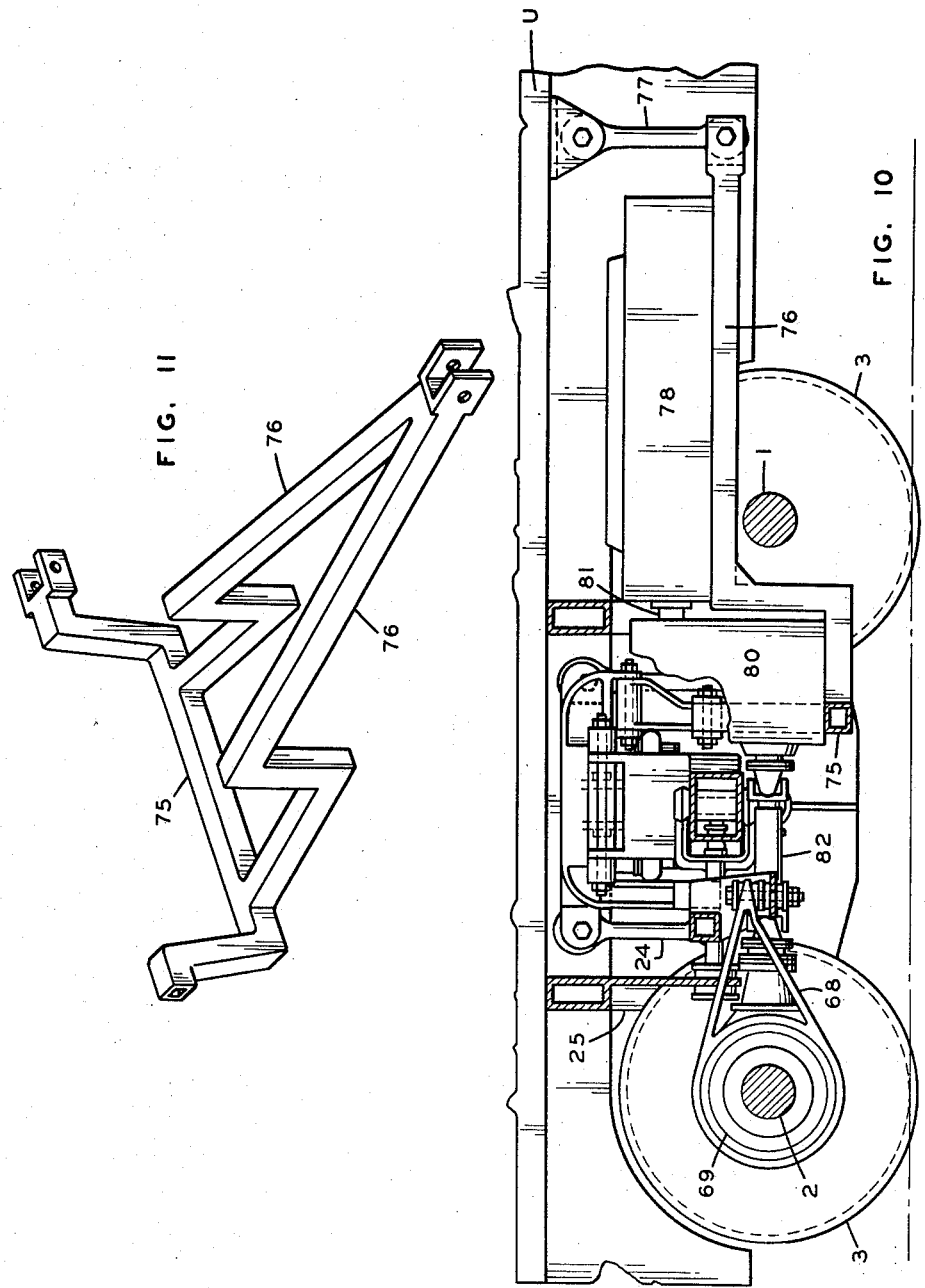
INVENTOR.
RICHARD L. LICH
BY
Francis T. Burgess
ATTORNEY

United States Patent Office 2,913,998
Patented Nov. 24, 1959

2,913,998

RAILWAY VEHICLE TRUCK STRUCTURE

Richard L. Lich, Ferguson, Mo., assignor to General Steel Castings Corporation, Granite City, Ill., a corporation of Delaware Application October 25, 1956, Serial No. 618,387

26 Claims. (Cl. 105—194)

The invention relates to railway vehicle trucks and consists particularly in motor and brake supporting structure for a truck of the type disclosed in my co-pending application, Serial No. 525,324, filed July 29, 1955, in which a vehicle body is supported by swing links from spring caps spring-supported on unsprung structure at either side of the truck.

It is the usual practice, in conventional trucks, to support disc brake mechanism, as well as motors and driving gear boxes, from the truck frame, which is spring-supported from the axles, in order to cushion these devices against impacts applied to the unsprung portions of the truck, usually the wheels, axles, journal boxes, and equalizers, by surface irregularities in the track.

In trucks of the type disclosed in the above-mentioned application, comprising unsprung side frames, a spring plank pivotally secured, on an axis transverse of the truck, to the middle of the side frames, separate vertically movable spring caps spring-supported from each end of the spring plank, and body-supporting swing links depending from each of the spring caps, there is no structure equivalent to the frame of a conventional truck, the only sprung structure being the separate spring caps. Since the nature of the body supporting means requires that the spring caps be movable vertically relative to each other, it is evident that it would not be feasible or mechanically possible to rigidly connect them by transverse members analogous to transom structure in a conventional truck frame, from which motors, gear boxes, and disc brake mechanism are usually suspended.

It is an object of this invention to provide spring-supported structure for mounting brake mechanism, gear boxes, and traction motors on trucks of the type described above.

It is a further object to suspend such structure from the spring caps in such a manner as not to interfere with their normal functioning.

I achieve the above objects by providing a transversely extending structure rigid with one of the spring caps and pivotally suspended from the other spring cap, whereby to accommodate relative vertical movements between the two caps. In the first embodiment of my invention, disc brake actuating mechanism is secured to the transverse structure connecting the spring caps. In the second form, the transverse structure is arranged to support transversely extending traction motors and the torque arms of the gear boxes associated therewith. In the third form, the transverse structure is arranged to support longitudinally extending traction motors and the torque arms of the gear boxes associated therewith. In the fourth form, one of the transversely extending structures is provided with a Delta-shaped longitudinal extension suspended at its apex from the vehicle underframe, for supporting a horizontally arranged internal combustion engine and its associated transmission, and the other transverse structure is arranged to support the torque arm of a gear box operatively connected to the transmission.

In the accompanying drawings in which selected embodiments of the invention are illustrated:

Figure 9 is a top view of a four-wheel truck in which structure is provided according to my invention for supporting a horizontally arranged internal combustion engine, its transmission, and the associated gear box.

Figure 10 is a longitudinal vertical sectional view along the line 10—10 of Figure 9.

Figure 11 is a perspective view of the engine-supporting structure shown in Figures 9 and 10.

Figure 1:
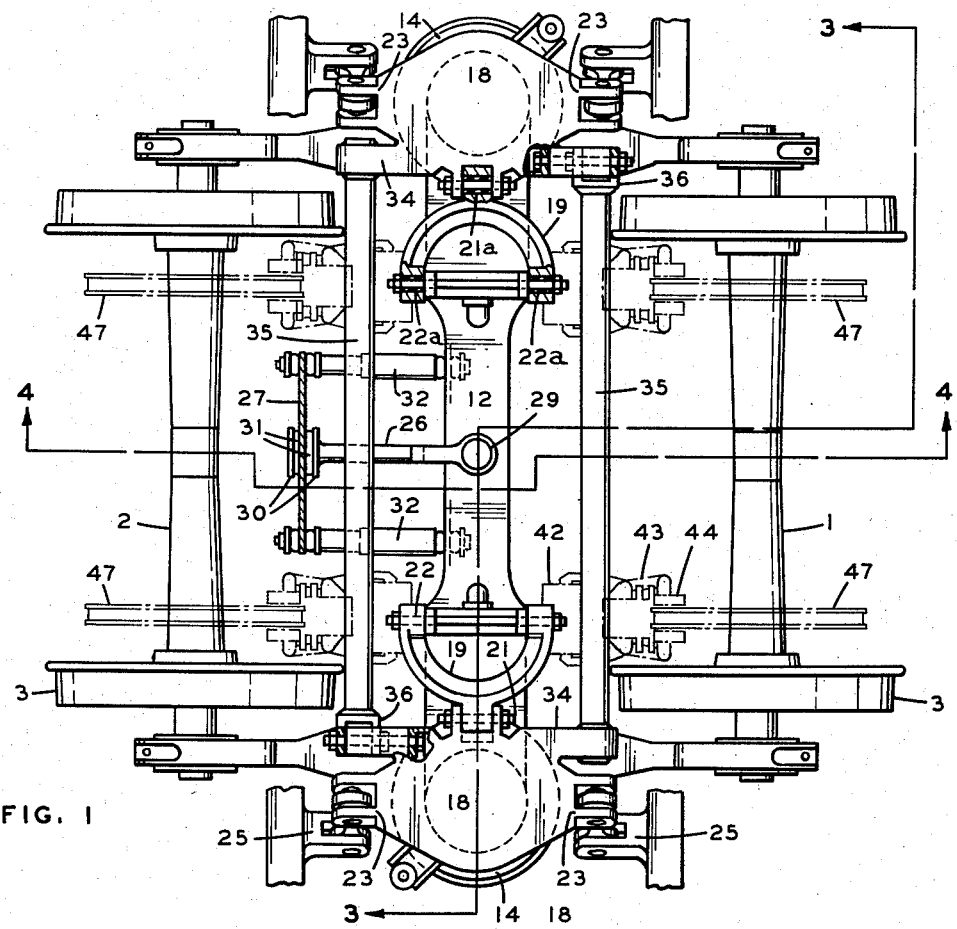
Figure 1 is a top view of a truck with disc brakes supported in accordance with my invention.
Figure 2:
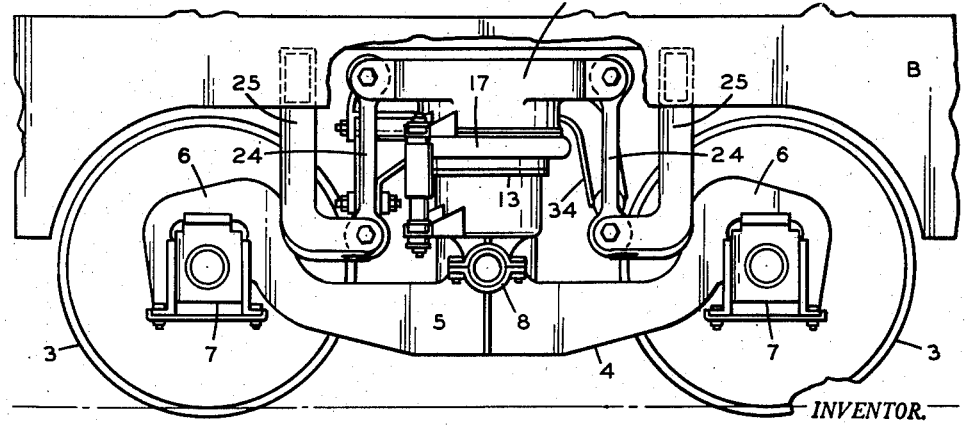
Figure 2 is a side view of the truck shown in Figure 1.
Figure 3:
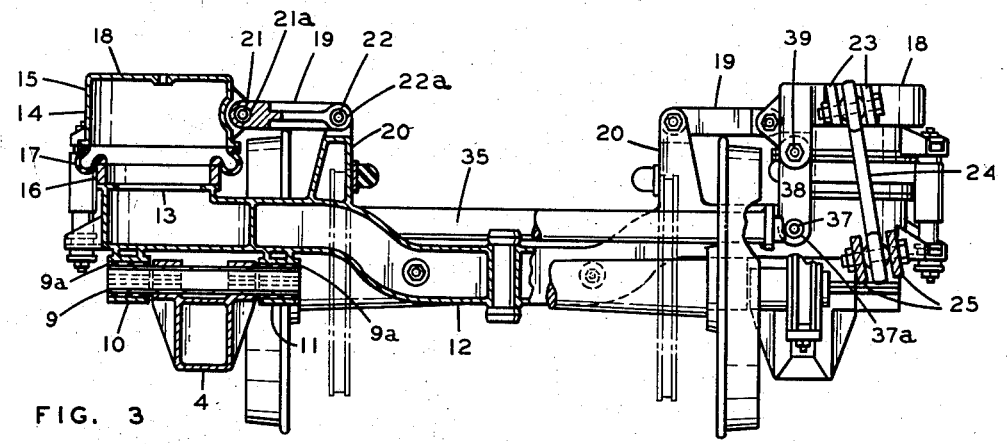
Figure 3 is a transverse sectional view along the line 3—3 of Figure 1.
Figure 4:
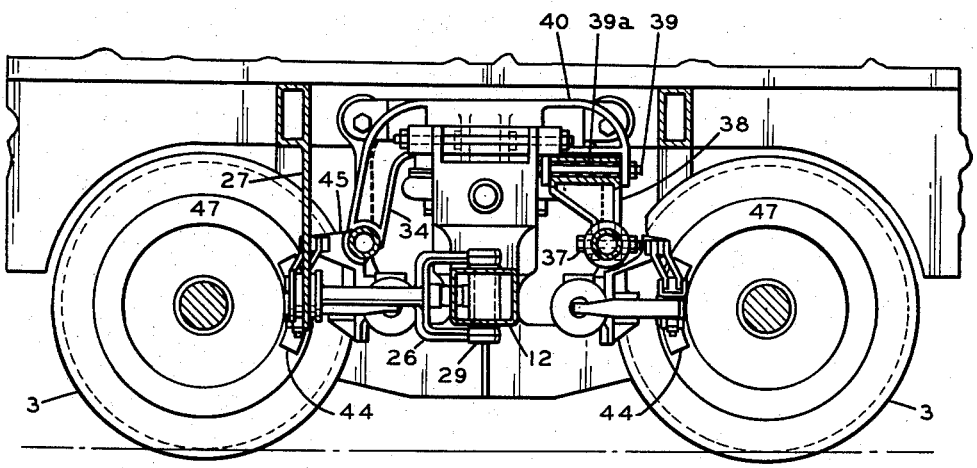
Figure 4 is a longitudinal vertical sectional view along the line 4—4 of Figure 1.

The truck includes a pair of wheel and axle assemblies comprising axles 1 and 2, and wheels 3. Longitudinally extending side frames 4 comprising a relatively low intermediate portion 5 and upstanding end portions 6 downwardly bifurcated to fixedly receive journal boxes 7, are supported through journal boxes 7 on axles 1 and 2. At their longitudinal centers, side frames 4 are provided with upwardly facing transversely extending cylindrical bearing surfaces 8 into which are rigidly clamped transversely extending tubes 9, the ends of which project a slight distance on each side of the side frames. A rubber bushing 9a is secured to each of the projecting extensions of tubular members 9, and depending cylindrical bearings 10 and 11 of transversely extending spring plank 12 are clamped to the outer surfaces of these bushings, so that each of the side frames can rotate in its longitudinal plane relative to the spring plank and the other side frame, but the torsional elasticity of the rubber bushings 9a will at all times tend to return the parts to their normal relative positions. The end portions of the spring plank are provided with seats 13 for air springs 14, the upper surface of the spring plank at the seat location being provided with an opening so as to permit utilization of the hollow interior of the spring plank casting as a surge chamber for the spring. The springs each comprise upper and lower cylinders 15 and 16, of different diameters, connected by an annular rubber sealing flap 17 to permit relative axial movement therebetween.

The upper cylinders 15 are embodied in spring caps 18. For restricting the spring caps to substantially vertical movements, they are connected by anchors 19 of the "wishbone" type to upstanding brackets 20 on the spring plank inboard of the side frames. It will be seen that the outer pivots 21 of anchors 19, and with them spring caps 18 will move through a small arc about the inner anchor pivots 22, but for practical purposes the length of the arc is so small relative to its radius that the movement of the spring cap will at all times be substantially vertical. Slight tilting of the spring cap about a transverse axis, as may be required during swivelling movements of the truck relative to the associated car body, is accommodated by rubber bushings 21a and 22a in pivots 21 and 22, respectively.

At each of their sides longitudinally of the truck, caps 18 are formed with brackets 23, in which are universally pivoted the upper ends of swing hangers 24, the lower ends of which are similarly universally pivoted to brackets 25 depending from the underframe structure of car body B, whereby the car body is supported from the spring cap and is movable transversely and longitudinally with respect thereto.

For preventing longitudinal movement but at the same time permitting transverse and vertical movements of the truck center relative to the body, the center of spring plank 12 is connected by a longitudinally extending anchor device 26 to a bracket 27 depending from the body underframe. The end of anchor 26 connected to the spring plank 12 is in the form of a clevis, the spring plank being received between the vertically spaced jaws thereof, which are connected by vertically extending pivot pin 29 extending through an opening at the center of the spring plank, so as to permit the truck to swivel relative to the body. At its other end anchor 26 is resiliently secured to brackets 27 by structure including collars 30 and rubber pads 31 compressed therebetween so as to permit limited universal movement of the anchor relative to the bracket 27. To dampen oscillations of the truck about pivot 29, a pair of longitudinally extending friction snubbers 32 are provided, one at each side of the anchor 26, one end of each of the snubbers 32 being secured to the spring plank and the other to bracket 27.

Each of the spring caps is formed, inboard of one of the hanger brackets 23, with a longitudinally extending and depending bracket 34, to the lower end of which is rigidly secured a transversely extending tubular beam 35. The opposite end of each beam 35 is provided with a clevis 36 which is secured by a pivot pin 37, extending longitudinally of the truck, to the lower end of a normally vertical hanger 38, the upper end of which is secured by a longitudinally extending pivot pin 39 to a bracket 40 on the opposite spring cap. Pivot pins 37 and 39 are rubber-bushed, respectively, as at 37a and 39a to permit a slight rotation of the beam 35 about its axis, relative to the spring cap to which it is connected by these pivots. By means of this arrangement, variations between the height of the spring caps during operation of the truck and tilting of the caps relative to each other in planes extending transversely or longitudinally of the truck are freely accommodated without interference from beams 35.

Disc brake actuating mechanisms comprising cylinders 42, levers 43, and shoes 44 are secured to each of the beams 35 by mounting brackets 45. The usual brake discs 47 are rigidly mounted on the axles so that their outer portions project between and are adapted for frictional engagement by the shoes 44 in the usual manner. Upon application of the brakes, the braking torque is taken by beams 35, and the associated spring caps which are stabilized against tilting longitudinally of the truck by the action of the body load through swing hangers 24, and by the spring plank through anchors 19.

Figure 5:
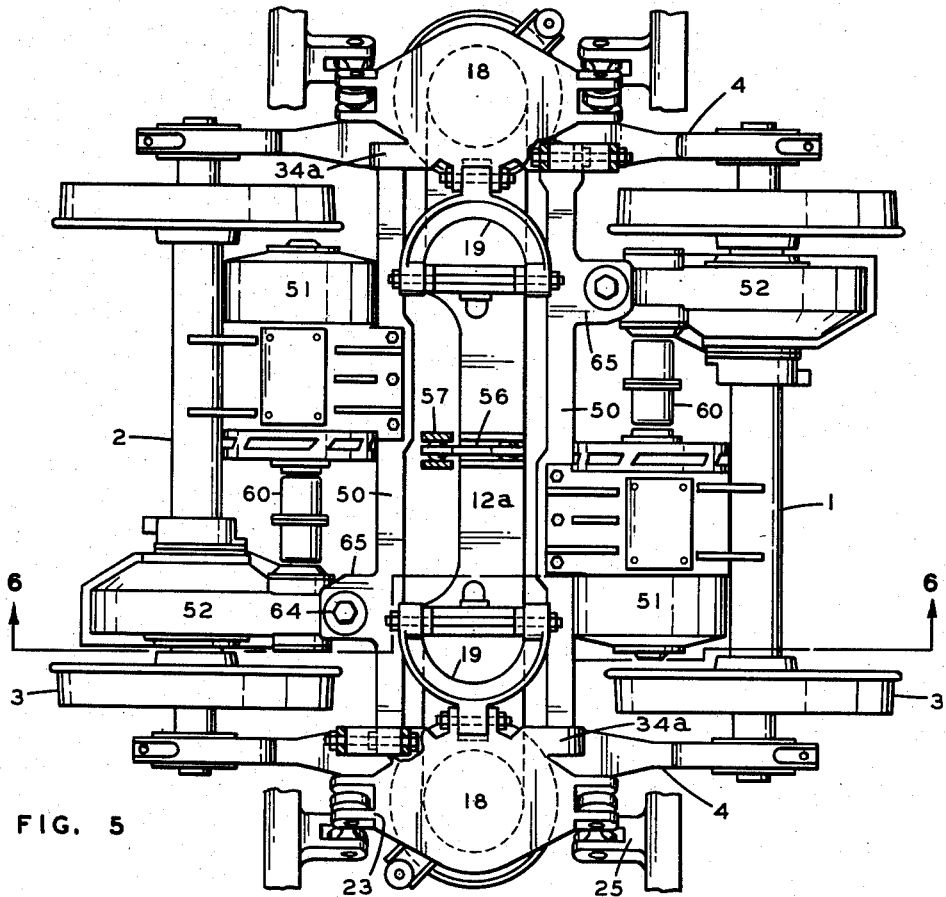
Figure 5 is a top view of a four-wheel truck in which structure is provided in accordance with my invention for supporting transversely etxending traction motors and their associated gear boxes.
Figure 6:
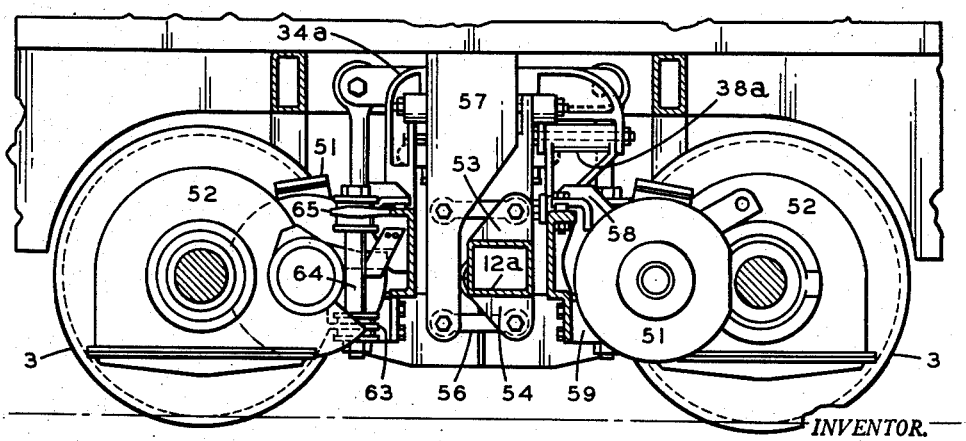
Figure 6 is a longitudinal vertical sectional view along the line 6—6 of Figure 5.

In the second form of my invention, shown in Figures 5 and 6, the truck structure is, in general, the same as that shown in the first form, and the same reference characters denote corresponding parts unless otherwise indicated. In this modification, transverse beams 50, corresponding generally to beams 35 in the first form, are provided to support transversely extending traction motors 51 and their associated driving gear boxes 52. To accommodate the motors, which occupy substantially greater space than the disc brakes shown in the first form, a different central anchor arrangement is used. The spring plank 12a is narrowed intermediate its ends and is offset longitudinally of the truck in this area. It is provided at its center with upstanding and depending brackets 53 and 54 to which are pivotally secured vertically spaced longitudinally extending links 56, the other ends of which are pivotally secured to a bracket 57 depending from the car body underframe. Spherical pivots are used to permit the universal movement of the links required to accommodate relative vertical, transverse, and swivelling movements between the body and truck. By offsetting the spring plank 12a as described above, the lower end portion of bracket 27 and the intermediate portion of the spring plank occupy the same space longitudinally of the truck as the spring plank 12 in the first form, and accordingly do not interfere with the location of the traction motors. Because the beams 50 must be located near the spring plank in order to accommodate the motors 51, supporting brackets 34a, to which transverse members 50 are rigidly secured, are modified by being shortened lengthwise of the truck as compared with brackets 34 in the first form, and hanger 38a, from the lower end of which each of the beams 50 is pivotally suspended, is offset towards rather than away from the spring plank as is the corresponding element of the first form. Beams 50 are of channel section, the upper motor mounting brackets 58 being secured to the upper flange and the lower motor mounting brackets 59 being secured in abutting relation with a vertical extension depending from the lower flange. The longitudinally extending shaft 60 of each of the motors enters gear boxes 52, the longitudinally extending torque brackets 63 of which are resiliently secured to the lower end of a vertically extending anchor 64, the upper end of which is resiliently secured to a bracket 65 extending horizontally and longitudinally from the upper flange of the members 50. It will be evident that the motors are thus cushioned from track shocks by reason of being supported from the spring-supported beams 50 and that beams 50, by reason of their stable support are easily capable of taking the motor and gear box torque.

Figure 7:
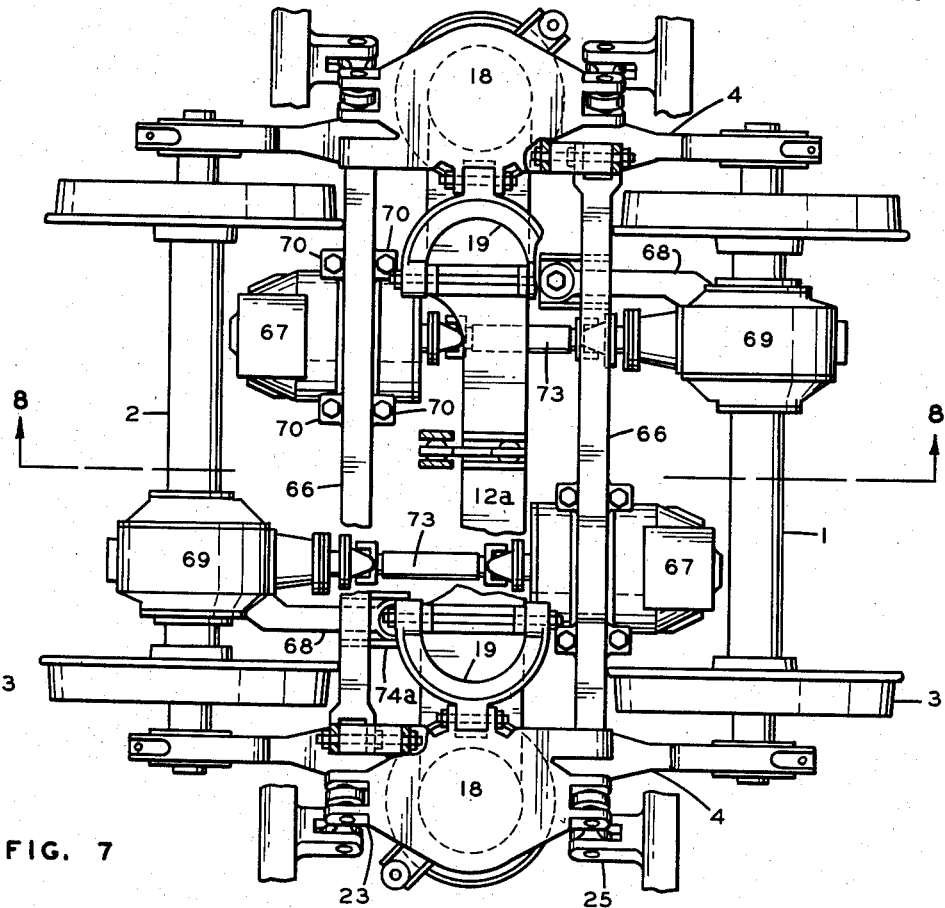
Figure 7 is a top view of a four-wheel truck in which structure is provided in accordance with my invention for supporting longitudinally extending traction motors and their associated gear boxes.
Figure 8:
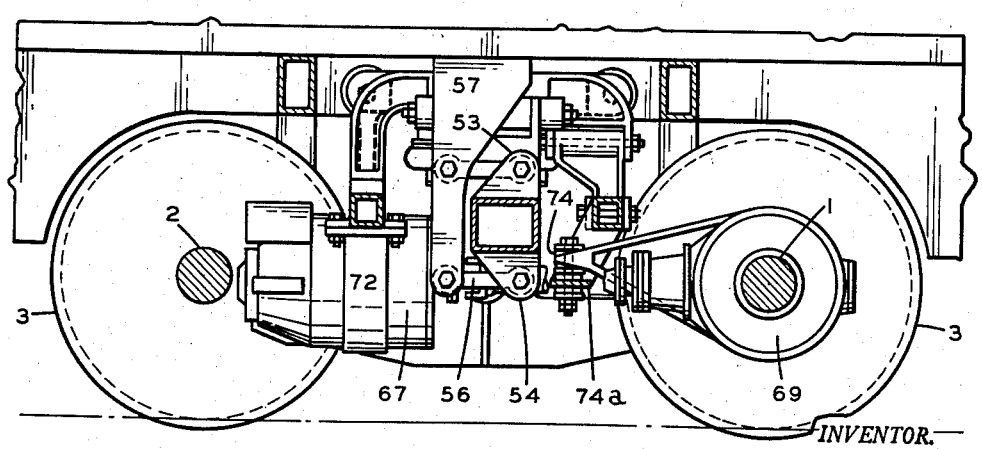
Figure 8 is a longitudinal vertical sectional view along the line 8—8 of Figure 7.

A third form of my invention is shown in Figures 7 and 8 in which the basic truck structure is similar to that shown in the preceding forms, and unless otherwise indicated, the same reference characters denote corresponding parts. In this embodiment the transverse beams 66 are arranged to support longitudinally extending motors 67 and the torque arms 68 of the associated gear boxes 69. Beams 66 are of box section and are slightly arched at one side to accommodate the motor so that its shaft may lie in substantially the same horizontal plane as the axles. At each side of the arched portion of each beam 66, it is provided with a pair of longitudinally aligned horizontal brackets 70 to which are bolted the ends of cradle 72 which underlying supports motor 67. Motors 67 are connected by means of Cardan shafts 73 to driving axle boxes 69 which contain the usual right-angle gearing, preferably of the hypoid type, and the torque arms 68 of the latter are connected at their outer ends by resilient connections, including rubber pads 74, to horizontal brackets 74a depending from beam 66.

Figures 9 and 10 illustrate a fourth form of the invention in which, as in the preceding forms, the same reference characters denote corresponding parts. In this embodiment one of the transverse beams 75 is formed with a Delta-shaped extension, comprising a pair of converging members 76, which is supported at its apex by a link 77 depending from the underframe U of the vehicle, and a horizontally disposed internal combustion engine 78 is supported on the members 76. It will be noted that the intermediate portion of beams 75 is depressed a substantial distance below the end portions, and that the adjacent end portions of members 76 are similarly depressed, the outer converging end portions of members 76 being elevated to clear the underlying axle 1. On the depressed portion of beam 75 and the adjacent depressed portions of members 76 is supported a hydraulic transmission 80 operatively connected by means of crank shaft 81 to engage 78, and with its output shaft connected by means of a Cardan shaft 82 to a gear box 69 substantially as described in connection with the third form of the invention. Gear box 69 is connected by means of its torque arm 68 to a transverse beam 66 also substantially as described in connection with the third form of the invention. It will be noted that the engine and transmission are partially supported by the truck structure and partially by link 77 depending from the car underframe. The spring plank 12 is connected to the underframe by a central link 26 and depending underframe bracket 27, and a pair of friction snubbing devices 32, all substantially as described hereinbefore. This arrangement makes it possible to mount a relatively large, powerful engine directly on a light, short wheelbase truck, to swivel therewith and thus eliminate the provision of either an electric drive or complex mechanical linkages required to accommodate swivelling of the truck when the engine is mounted on the vehicle underframe in the usual manner.

It will, of course, be understood that various changes in details of construction and arrangement of parts may be made by those skilled in the art without departing from the spirit of the invention as set forth in the appended claims.

What is claimed is:

1. In a railway truck, wheel and axle assemblies, framing supported thereon, springs carried by said framing, separate load-carrying members supported on said springs at each side of the truck, and an equipment-carrying member rigidly secured at its one end to one of said load-carrying members and flexibly secured at its other end to the other of said load-carrying members whereby to accommodate relative vertical and tilting movements between said load-carrying members.

2. In a railway truck, wheel and axle assemblies, framing supported thereon, springs carried by said framing, separate load-carrying members supported on said springs at each side of the truck, equipment-carrying members each rigidly secured at their one end to diagonally opposite portions of said load-carrying members and flexibly secured at their other end to other diagonally opposite portions of said load-carrying members whereby to accommodate relative vertical and tilting movements between said load-carrying members.

3. In a railway truck, wheel and axle assemblies, framing including a transverse member and a pair of transversely spaced longitudinal members supported on said wheel and axle assemblies, springs carried by said framing, separate load-carrying members supported on said springs at each side of the truck, anchors connecting said load-carrying members and said framing for restraining said load-carrying members against substantial longitudinal and transverse movements relative to said framing while permitting vertical movements of said load-carrying members, and an equipment-carrying member rigidly secured at its one end to one of said load-carrying members and flexibly secured at its other end to the other of said load-carrying members whereby to accommodate such relative movements between said load-carrying members and said framing as are permitted by said anchor means.

4. In a railway truck, wheel and axle assemblies, framing supported thereon, springs carried by said framing, separate load-carrying members supported on said springs at each side of the truck, anchor means connecting each of said load-carrying members and said framing whereby to permit vertical movements of said load-carrying members relative to the frame while resisting longitudinal and transverse movements of said load-carrying members, and an equipment-carrying member rigidly secured at its one end to one of said load-carrying members and transversely swingably secured at its other end to the other of said load-carrying members whereby to accommodate relative movements as permitted by said anchor means.

5. In a railway truck, a pair of wheel and axle assemblies, longitudinal members supported near their ends on said assemblies at each side of the truck, a transverse member connecting said longitudinal members intermediate said assemblies, springs on the ends of said transverse member, separate load-carrying members carried by the springs at each side of the truck, and an equipment-carrying member rigidly secured at its one end to the load-carrying member at one side of the truck and transversely swingably secured at its other end to the load-carrying member at the other side of the truck whereby to accommodate relative vertical and tilting movements between the load-carrying members.

6. In a railway truck, a pair of wheel and axle assemblies, longitudinal members supported near their ends on said assemblies at each side of the truck, a transverse member pivotally secured on an axis transverse of the truck to said longitudinal members intermediate said assemblies, springs on the ends of said transverse member, separate load-carrying members carried by the springs at each side of the truck, an anchor device connecting each of said load-carrying members to said transverse member for resisting movement of said load-carrying member longitudinally and transversely of the truck while permitting vertical and tilting movements of said load-carrying member, a transversely extending equipment-carrying member rigidly secured at its one end to one of said load-carrying members, a hanger pivotally pendent on a longitudinal axis from the other of said load-carrying members, said equipment-carrying member being pivotally secured at its other end along a longitudinal axis to said hanger whereby to offer a solid support for equipment carried by said equipment-carrying member and simultaneously accommodate such movements of said load-carrying members relative to each other as may be permitted by said anchor devices.

7. In a railway truck as described in claim 6, resilient bushings associated with the longitudinally extending pivots in said anchor devices and said hangers whereby to permit and accommodate, respectively, tilting of said load-carrying members in their longitudinal vertical planes.

8. In a railway vehicle, a truck comprising wheel and axle assemblies, framing including a transverse member and a pair of transversely spaced longitudinal members supported on said wheel and axle assemblies, springs carried by said framing, separate load-carrying members supported on said springs at each side of the truck, anchors connecting said load-carrying members and said framing for restraining said load-carrying members against substantial longitudinal and transverse movements relative to said framing while permitting substantial vertical movements of said load-carrying members, hangers depending from said load-carrying members, a vehicle body supported from said hangers, a draft connection between said transverse member and said vehicle body permitting relative transverse and swiveling movements therebetween, and an equipment-carrying member rigidly secured at its one end to one of said load-carrying members and flexibly secured at its other end to the other of said load-carrying members whereby to accommodate relative movements between said load-carrying members and said framing as are permitted by said anchor means.

9. In a railway truck, wheel and axle assemblies, framing supported thereon, springs carried by said framing, separate load-carrying members supported on said springs at each side of the truck, a transversely extending structure rigidly secured at its one end to one of said load-carrying members and flexibly secured at its other end to the other of said load-carrying members whereby to accommodate relative movements between said load-carrying members, and brake structure secured to said transversely extending structure whereby said brake structure is cushioned against shocks applied to said wheel and axle assemblies and the framing supported thereon.

10. A railway truck as described in claim 9 in which the transversely extending structure is of tubular cross section for supporting disc brake actuating mechanisms.

11. In a railway truck, a pair of wheel and axle assemblies, longitudinal members supported near their ends on said assemblies at each side of the truck, a transverse member connecting said longitudinal members intermediate said assemblies, springs on the ends of said transverse member, separate load-carrying members carried by the springs at each side of the truck, transversely extending structure rigidly secured at its one end to the load-carrying member at one side of the truck and transversely swingably secured at its other end to the load-carrying member at the other side of the truck whereby to accommodate relative movements between the load-carrying members, and brake structure secured to said structure whereby said brake structure is cushioned by said springs from impacts imparted by the track to said wheel and axle assemblies and said longitudinal and transverse members.

12. In a railway truck, wheel and axle assemblies, framing supported thereon, springs carried by said framing, separate load-carrying members supported on said springs at each side of the truck, transverse structure rigidly secured at its one end to one of said load-carrying members and flexibly secured at its other end to the other of said load-carrying members whereby to accommodate relative movements between said load-carrying members, a traction motor supported from said transverse structure, a driving gear box supported on one of said axles, and an operative connection between said traction motor and said driving gear box.

13. In a railway truck, a pair of wheel and axle assemblies, longitudinal members supported near their ends on said assemblies at each side of the truck, a transverse member connecting said longitudinal members intermediate said assemblies, springs on the ends of said transverse member, separate load-carrying members carried by the springs at each side of the truck, and transversely extending structure rigidly secured at its one end to the load-carrying member at one side of the truck and transversely swingably secured at its other end to the load-carrying member at the other side of the truck whereby to accommodate relative movements between the load-carrying members, a traction motor supported from said transverse structure, a driving gear box supported on one of said axles, and an operative connection between said motor and said driving gear box.

14. A railway truck according to claim 13 in which the transversely extending structure is formed with a substantially horizontal top surface and a vertical surface at a lower level, said motor being arranged with its axis transversely of the truck and being formed with a horizontally extending bracket adapted to be secured to the horizontal top surface of said transversely extending structure, and a vertical bracket adapted to engage said vertical surface of said transversely extending structure, said driving gear box having a torque arm supported from said structure.

15. A railway truck according to claim 13 in which a transversely extending U-shaped cradle is dependingly supported from said transversely extending structure, said traction motor being supported by said cradle and being arranged with its axis extending longitudinally of the truck, and a second similar transverse structure, said first-named and second transverse structure being spaced apart longitudinally of the truck and supported from opposite ends of said load-carrying structure, said driving gear box having a torque arm supported from said second transverse structure.

16. In a railway truck, a pair of wheel and axle assemblies, longitudinal members supported near their ends on said assemblies at each side of the truck, a transverse member pivotally secured on an axis transverse of the truck to said longitudinal members intermediate said assemblies, springs on the ends of said transverse member, separate load-carrying members carried by the springs at each side of the truck, an anchor device connecting each of said load-carrying members to said transverse member for preventing substantial movement of said load-carrying member longitudinally and transversely of the truck while permitting vertical and tilting movements of said load-carrying member, a transversely extending channel-section member rigidly secured at its one end to one of said load-carrying members, a hanger pivotally pendent on a longitudinal axis from the other of said load-carrying members, said channel-section member being pivotally secured at its other end along a longitudinal axis to said hanger and being arranged with its web vertically disposed, the lower flange of said channel-section member having vertically disposed rebent terminals, a traction motor arranged with its axis extending transversely of the truck and having a horizontally extending bracket secured to the upper flange of the channel-section member, a vertical bracket secured in abutting relation with said vertical terminals, and resilient bushings associated with the longitudinally extending pivots in said anchor devices and said hangers whereby to permit and accommodate, respectively, tilting of said load-carrying members in their longitudinal vertical planes.

17. In a railway truck, a pair of wheel and axle assemblies, longitudinal members supported near their ends on said assemblies at each side of the truck, a transverse member pivotally secured on an axis transverse of the truck to said longitudinal members intermediate said assemblies, springs on the ends of said transverse member, separate load-carrying members carried by the springs at each side of the truck, an anchor device connecting each of said load-carrying members to said transverse member for preventing substantial movement of said load-carrying member longitudinally and transversely of the truck, a transversely extending beam rigidly secured at its one end to one of said load-carrying members, a hanger pivotally pendent on a longitudinal axis from the other of said load-carrying members, said beam being pivotally secured to said hanger, a transversely extending U-shaped cradle dependingly supported from said beam, a traction motor supported by said cradle and having its axis extending longitudinally of the truck, a second transverse beam having a rigid mounting on said other load-carrying member diagonally opposite the rigid mounting of said first beam and a swingable mounting on said one load-carrying member diagonally opposite the hanger mounting of said first beam, a driving gear box mounted on the axle adjacent said second beam and having a longitudinally extending torque arm secured to said second beam, resilient bushings associated with the longitudinally extending pivots in said anchor devices and said hangers whereby to permit and accommodate, respectively, tilting of said load-carrying members in their longitudinal vertical planes.

18. In a railway vehicle, a truck comprising wheel and axle assemblies, framing supported thereon, springs carried by said framing, separate load-carrying members supported on said springs at each side of the truck, a vehicle body supported from said load-carrying members and a connection between said truck and vehicle body preventing relative longitudinal movements therebetween while permitting relative lateral and swiveling movements, a framework rigidly secured at one side to one of said load-carrying members and flexibly secured at its other side to the other of said load-carrying members whereby to accommodate relative movements between said load-carrying members, said framework being flexibly secured at a point longitudinally spaced from said load-carrying members to said vehicle body, a power source mounted on said framework and operatively connected to at least one of said wheel and axle assemblies.

19. In a railway vehicle, a truck comprising a pair of wheel and axle assemblies, longitudinal members supported near their ends on said assemblies at each side of the truck, a transverse member connecting said longitudinal members intermediate said assemblies, springs on the ends of said transverse member, separate load-carrying members carried by the springs at each side of the truck, a vehicle body supported from said load-carrying members, a connection between said transverse member and said vehicle body for permitting relative swiveling and transverse movements between said vehicle body and said truck while preventing longitudinal movements therebetween, a framework rigidly secured at its one side to said load-carrying members at one side of the truck and at its other side transversely swingably secured to the load-carrying member at the other side of the truck, said framework extending longitudinally over one of the axles and being universally swingably secured at its end to the vehicle body, a horizontal engine and its associated transmission being supported on said framework, a transverse beam rigidly secured to the load-carrying member at one side of the truck and transversely swingably secured at its other end to the load-carrying member at the other side of the truck, a driving gear box supported on the other axle and having a longitudinally extending torque arm resiliently supported from said beam, and a driving connection between said transmission and said driving gear box.

20. In a railway vehicle, a truck comprising a pair of wheel and axle assemblies, longitudinal members supported near their ends on said assemblies at each side of the truck, a transverse member pivotally secured on an axis transverse of the truck to said longitudinal members intermediate said assemblies, springs on the ends of said transverse member, separate load-carrying members carried by the springs at each side of the truck, anchor devices connecting each of said load-carrying members to said transverse member for resisting movement of said load-carrying member longitudinally and transversely of the truck while permitting vertical and tilting movements of said load-carrying member, a vehicle body supported from said load-carrying members, a draft connection between said transverse member and said vehicle body for permitting swiveling and relative transverse movements therebetween, additional means associated with said draft connection for damping oscillatory swiveling movements, a substantially horizontal triangular structure including a transverse element rigidly secured at one end to the load-carrying element at one side of the truck, a hanger pivotally pendent on a longitudinal axis from the other of said load-carrying members, said transverse element being pivotally secured at its other end along a longitudinal axis to said hanger, the apex of said triangular structure being positioned lengthwise of the truck and vehicle from the transverse element, a link depending from the vehicle and supporting said triangular structure at its apex, said link being secured to said vehicle and to said triangular structure by universal connections whereby to accommodate swiveling of the truck relative to the vehicle body, a horizontally disposed internal combustion engine supported on said triangular structure, a transmission supported on said structure and operatively associated with said engine, a transverse beam rigidly secured to said other load-carrying member, a second hanger pivotally pendent on a longitudinal axis from the load-carrying member at the one side of the truck, said beam being pivotally secured at its other end along a longitudinal axis to said second hanger, a driving gear box associated with the axle adjacent said beam and operatively connected to said transmission, a torque arm on said driving gear box, said torque arm being secured to said beam, and resilient bushings associated with the longitudinally extending pivots in said anchor devices and said hangers whereby to permit and accommodate, respectively, tilting of said load-carrying members in their longitudinal vertical planes.

21. In a railway vehicle, a truck having wheel and axle assemblies, framing supported thereon, springs carried by said framing, separate load-carrying members supported on said springs at opposite sides of the truck, a vehicle underframe supported from said load-carrying members, a first equipment-carrying member rigidly secured to one load-carrying member and flexibly secured to the opposite load-carrying member, a second equipment-carrying member flexibly secured to said one load-carrying member and rigidly secured to said opposite load-carrying member whereby to accommodate relative vertical and tilting movements between said load-carrying members, equipment carried by said equipment-carrying members, and longitudinal connections between said truck and said underframe.

22. Structure according to claim 21, in which said longitudinal connections include a draft link between said framing and said underframe.

23. Structure according to claim 22, in which said longitudinal connections include rigid structure extending longitudinally of the truck from one of said equipment-carrying members and pivotally suspended at its opposite end from the underframe, driving equipment being supported by said rigid structure and the associated equipment-carrying member.

24. Structure according to claim 22, in which said longitudinal connections include snubbing devices between said framing and said underframe for damping oscillation of said truck about a vertical pivotal axis.

25. In a railway vehicle, a truck having wheel and axle assemblies, framing supported thereon, springs carried by said framing, separate load carrying members supported on said springs at each side of the truck, anchors connecting each of said load-carrying members and said framing whereby to permit vertical movements while resisting longitudinal and transverse movements of said load-carrying members relative to said frame, swing hangers pendent from said load-carrying members, a vehicle underframe supported by said swing hangers, a first equipment-carrying member rigidly connected to one load-carrying member and transversely swingably-connected to the opposite load-carrying member, a second equipment-carrying member transversely swingably-connected to said one load-carrying member and rigidly connected to said opposite load-carrying member, equipment carried by said equipment-carrying members, and longitudinal connections between said truck and said underframe including a draft link between said framing and said underframe.

26. In a railway vehicle, a truck having a pair of wheel and axle assemblies, longitudinal members supported near their ends on said assemblies at each side of the truck, a transverse member pivotally secured on an axis transverse of the truck to said longitudinal members intermediate said assemblies, springs on the ends of said transverse member, separate load-carrying members carried by the springs at each side of the truck, an anchor device connecting each of said load-carrying members to said transverse member for resisting movement of said load-carrying members longitudinally and transversely of the truck while permitting vertical and tilting movements of said load-carrying members, a vehicle underframe supported from said load-carrying members for pivotal movement relative to said truck about a vertical axis substantially at the center of said truck, a first transversely extending equipment carrying member rigidly secured at its one end to one load-carrying member, a second transversely extending equipment-carrying member rigidly secured at its one end to the opposite load-carrying member, a hanger pivotally pendent on an axis longitudinal of the truck from each of the load-carrying members, said equipment-carrying members each being pivotally secured at their ends opposite their rigidly secured ends on an axis longitudinal of the truck to one of said hangers whereby to provide a solid support for equipment carried by said equipment-carrying members and simultaneously accommodate such movements of said load-carrying members relative to each other as may be permitted by said anchor devices, and longitudinal connections between said truck and said underframe including a draft link between said transverse member and said underframe.

References Cited in the file of this patent

UNITED STATES PATENTS

| | | | |
|---|---|---|---|
| 433,754 | Wharton | Aug. 5, | 1890 |
| 2,358,279 | Piron | Sept. 12, | 1944 |
| 2,527,008 | Haynes | Oct. 24, | 1950 |